(12) United States Patent
Seo et al.

(10) Patent No.: US 7,970,356 B2
(45) Date of Patent: Jun. 28, 2011

(54) METHOD OF ESTIMATING LOCATION OF TERMINAL IN SWITCHED-BEAMFORMING BASED WIRELESS COMMUNICATION SYSTEM

(75) Inventors: Chang-Woo Seo, Suwon-si (KR); Jin-Youn Cho, Seoul (KR); Dong-Jun Lee, Seoul (KR); Kyung-Hun Jang, Suwon-si (KR); Gang-Youl Yu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 477 days.

(21) Appl. No.: 11/653,199

(22) Filed: Jan. 12, 2007

(65) Prior Publication Data
US 2007/0202880 A1 Aug. 30, 2007

(30) Foreign Application Priority Data
Feb. 23, 2006 (KR) .................. 10-2006-0017775

(51) Int. Cl.
*H04B 15/00* (2006.01)
*H04W 24/00* (2009.01)
(52) U.S. Cl. ................. 455/63.4; 455/456.1; 455/456.2; 455/456.3
(58) Field of Classification Search ............... 455/562.1, 455/13.3, 19.83, 428, 436, 456.1–456.3, 455/63.4
See application file for complete search history.

(56) References Cited

U.S. PATENT DOCUMENTS

| | | | |
|---|---|---|---|
| 6,968,022 B1* | 11/2005 | Poor et al. ................ | 375/346 |
| 2003/0114196 A1* | 6/2003 | Chitrapu ................. | 455/562 |
| 2003/0181163 A1* | 9/2003 | Ofuji et al. .............. | 455/25 |
| 2004/0063468 A1* | 4/2004 | Frank ...................... | 455/561 |
| 2005/0176468 A1* | 8/2005 | Iacono et al. ........... | 455/562.1 |
| 2005/0197162 A1* | 9/2005 | Fujishima et al. ...... | 455/562.1 |
| 2006/0154667 A1* | 7/2006 | Seo et al. ................ | 455/446 |
| 2006/0164969 A1* | 7/2006 | Malik et al. ............. | 370/203 |

* cited by examiner

*Primary Examiner* — Jinsong Hu
*Assistant Examiner* — Mong-Thuy Tran
(74) *Attorney, Agent, or Firm* — NSIP Law

(57) ABSTRACT

A terminal location estimation method in a wireless communication system in which an access point (AP) provides an access service to a plurality of terminals includes defining a plurality of beam spaces around the AP through space multiplexing; scheduling the beam spaces according to a predetermined pattern; simultaneously forming a beam in at least one beam space; and detecting the existence and location of a terminal according to whether a response message in response to the formed beam is received. Accordingly, an AP forms beams in a predetermined scheduling pattern, and each of the terminals detecting the beams registers its location by informing the AP that each of the terminals exists in a relevant beam area, and thus, a location of each of the terminals can be estimated without using a complex DOA algorithm.

4 Claims, 7 Drawing Sheets

METHOD OF ESTIMATING LOCATION OF TERMINAL IN SWITCHED-BEAMFORMING BASED WIRELESS COMMUNICATION SYSTEM

PRIORITY

This application claims priority under 35 U.S.C. §119 to an application entitled "Method of Estimating Location of Terminal in Switched-Beamforming Based Wireless Communication System" filed in the Korean Intellectual Property Office on Feb. 23, 2006 and assigned Serial No. 2006-17775, the contents of which are incorporated herein by reference.

BACKGROUND OF THE INVENTION

1. Field of the Invention

The present invention relates generally to a wireless communication system, and in particular, to a method of estimating the location of a terminal in a switched-beamforming based wireless communication system.

2. Description of the Related Art

In conventional cellular wireless communication systems, an access point (AP) transmits and receives signals using an omni-directional antenna, and according to the characteristics of the omni-directional antenna, the AP can communicate with terminals in a service area but cannot communicate with terminals outside the service area.

An IEEE 802.11 based wireless local area network (WLAN) is one of the cellular wireless communication systems. FIG. 1 is a schematic configuration of a conventional wireless communication system. Referring to FIG. 1, a service area 10 of an AP 110 is determined by the level of transmission power. Terminals 121 and 122 in the service area 10 can communicate with the AP 110, but a terminal 123 outside the service area 10 cannot communicate with the AP 110.

FIG. 2 is a schematic configuration of a WLAN operated by an improved AP 210. Referring to FIG. 2, the AP 210 communicates with all terminals using a smart antenna. The AP 210 having the smart antenna can form a beam directing each of the terminals, and each of the terminals also can form a beam directing the AP 210, thereby improving system performance. If an IEEE 802.11 system uses the smart antenna, since the AP 210 can concentrate transmission power in a specific direction in which a terminal is located, as illustrated in FIG. 2, a service area can be expanded in the specific direction.

However, according to the characteristics of a carrier sense multiple access (CSMA) mechanism of the IEEE 802.11 system, a certain terminal examines whether other terminals occupy a channel and operates according to the channel state. Thus, when a directional beam is used, the certain terminal cannot detect signals transmitted from other terminals in the WLAN. In other words, a terminal of the IEEE 802.11 system measures signals transmitted from APs and other terminals, and if signals transmitted from the other terminals are not detected, the terminal tries channel occupation. Thus, when a directional antenna is used, in many cases, a terminal determines that a channel is in an idle state even if the channel is being used. This phenomenon, called a hidden beam problem, significantly affects the system performance.

In addition, in a smart antenna mechanism, the movement of a terminal must be traced for reliable communication, and a direction of arrival (DOA) scheme is used in general as a terminal location estimation scheme.

FIG. 3 is a conceptual diagram for explaining the DOA scheme in a conventional cellular system using a smart antenna. Referring to FIG. 3, when a terminal 320 communicating with an AP 310 in a beam area 30 moves, the AP 310 cannot detect the movement of the terminal 320. Thus, the terminal 320 transmits a beam request message to the AP 310 to inform the AP 310 of a location thereof, and then, the AP 310 can detect a location of the moved terminal 320' through a DOA algorithm by receiving the beam request message. When the AP 310 detects the location of the terminal 320', the AP 310 communicates with the terminal 320' by forming a beam directed to the detected location.

However, in the conventional DOA scheme, since an AP cannot detect the movement of a terminal until the AP receives a beam request message from the terminal, the probability that a downstream link transmission error is generated is high. In addition, since the AP must perform the DOA algorithm every time the AP receives a beam request message from the terminal, an excessive processing overhead is generated.

SUMMARY OF THE INVENTION

An object of the present invention is to substantially solve at least the above problems and/or disadvantages and to provide at least the advantages below. Accordingly, an object of the present invention is to provide a location estimation method in a cellular system for improving communication quality by quickly detecting a location of a terminal without using a complex DOA algorithm.

The above object is achieved by providing a terminal location estimation method for a cellular wireless communication system in which an AP provides an access service to a plurality of terminals.

According to one aspect of the present invention, there is provided a terminal location estimation method for a wireless communication system in which an AP provides an access service to a plurality of terminals, the method including defining, by the AP, a plurality of beam spaces through space multiplexing; scheduling the beam spaces according to a predetermined pattern; simultaneously forming a beam in at least one beam space; and detecting the existence and location of a terminal according to whether a response message in response to the formed beam is received.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Preferred embodiments of the present invention will be described herein below with reference to the accompanying drawings.

Figure 1:
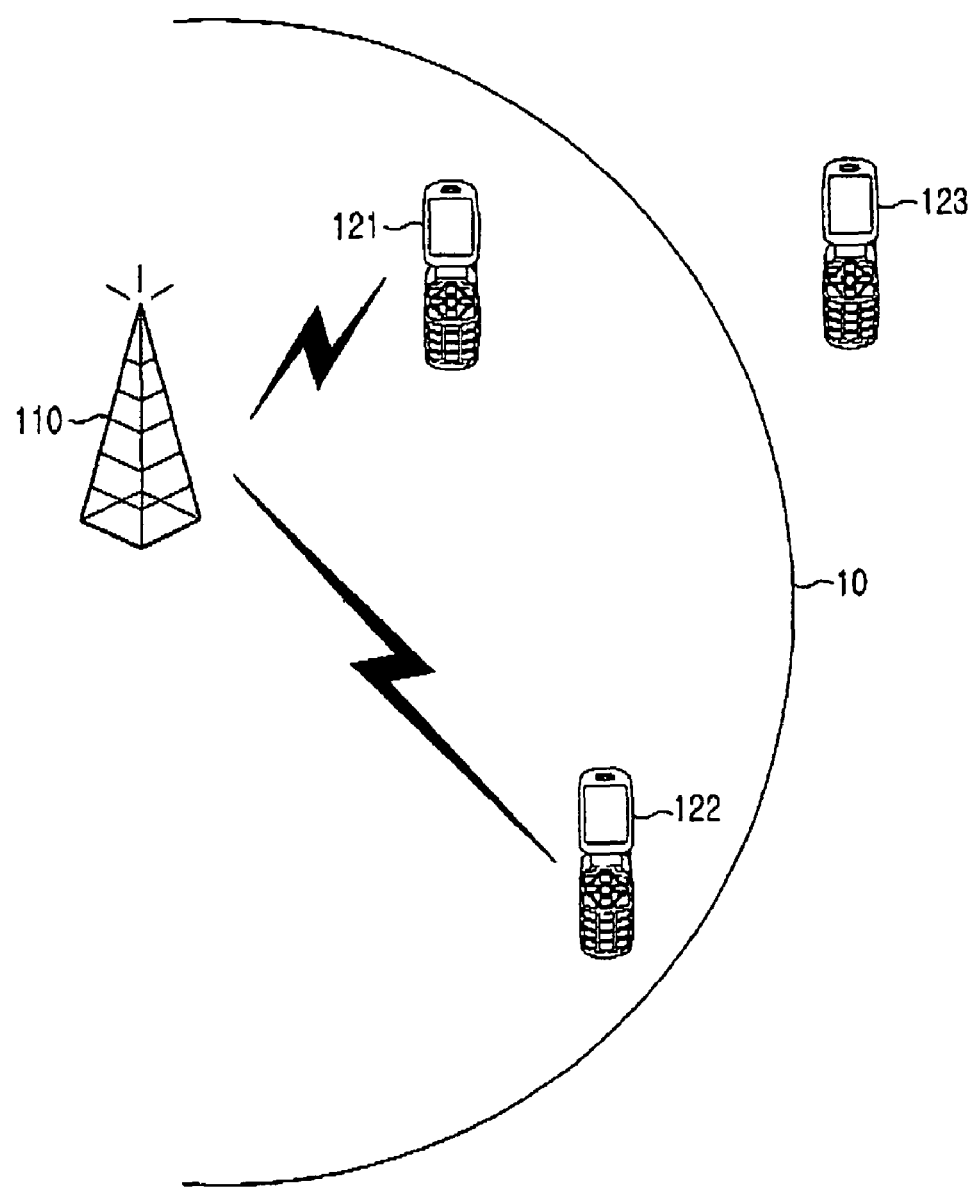
FIG. 1 is a schematic configuration of a conventional wireless communication system.
Figure 2:
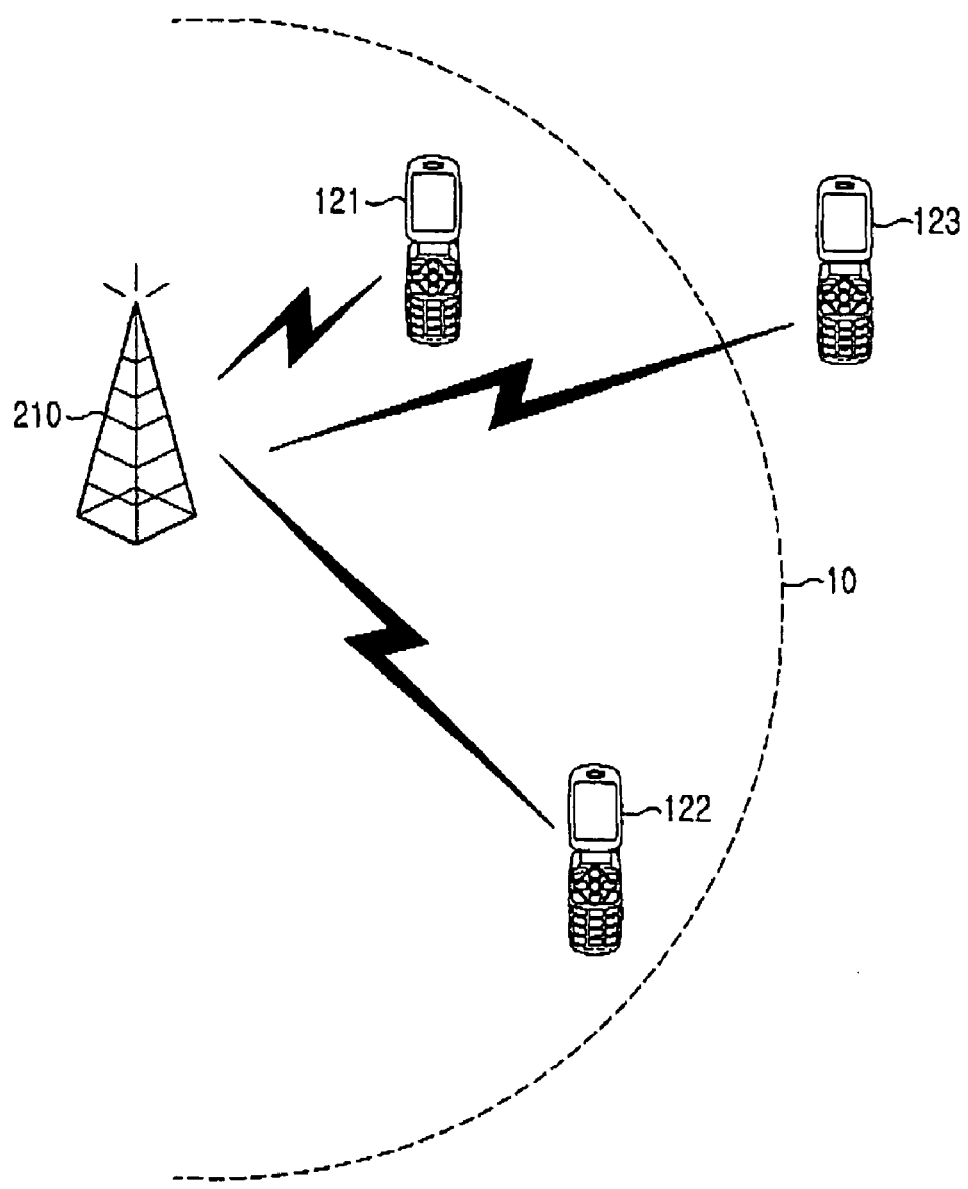
FIG. 2 is a schematic configuration of a WLAN operated by an improved AP.
Figure 3:
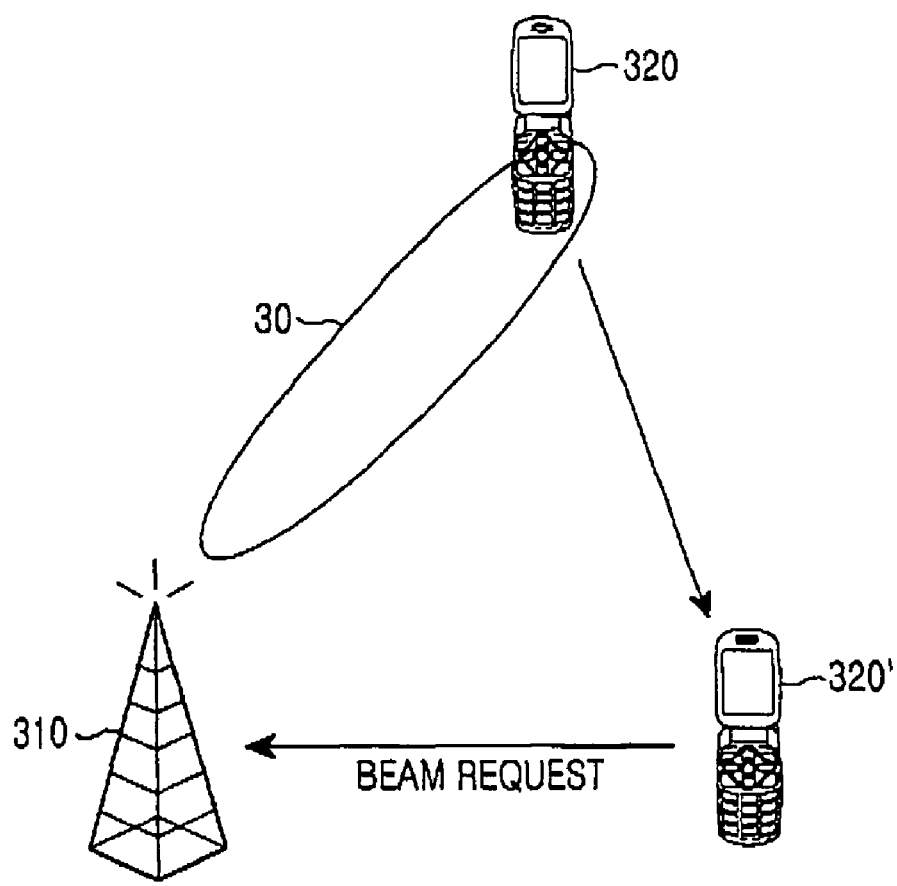
FIG. 3 is a conceptual diagram for explaining a DOA scheme in a conventional cellular system using a smart antenna.
Figure 4:
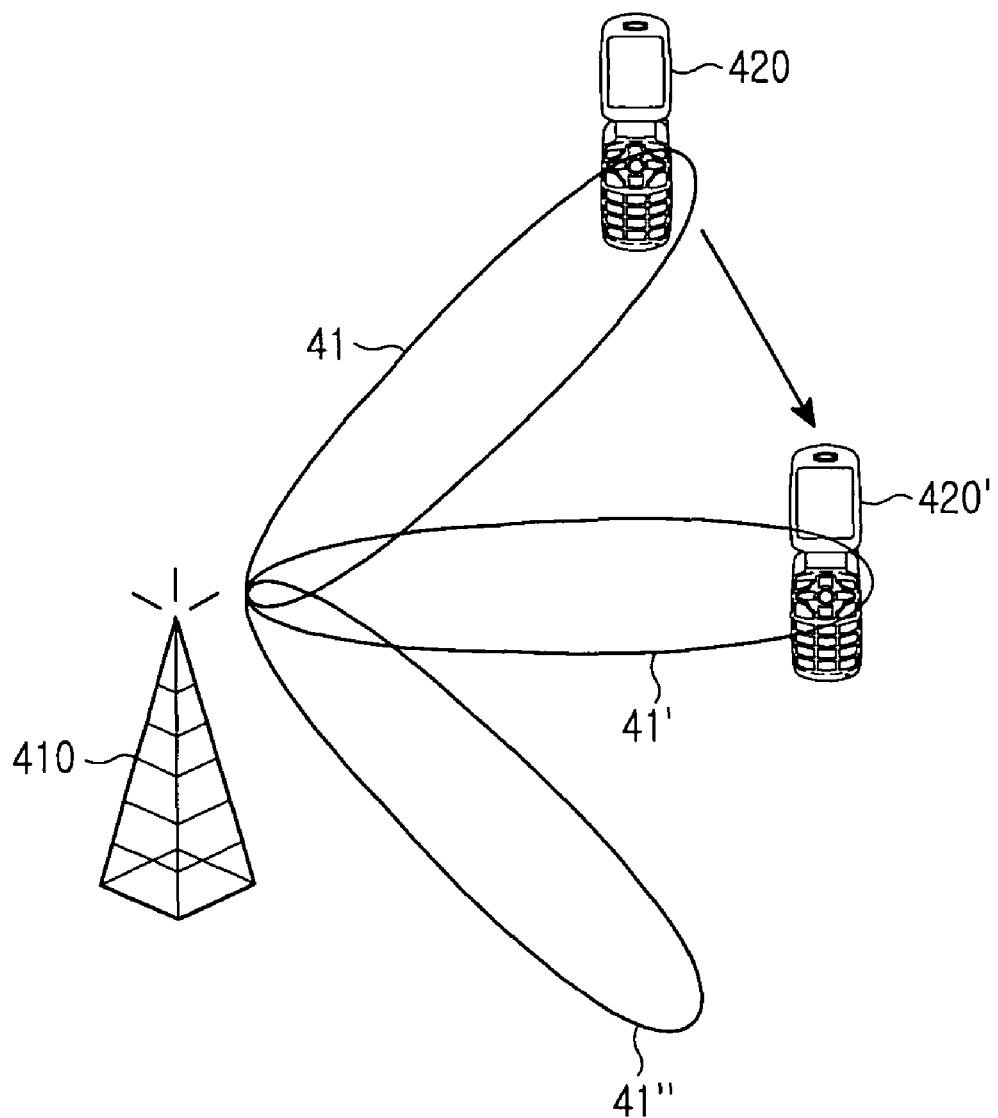
FIG. 4 is a diagram for explaining a terminal location estimation method in a communication system according to a first embodiment of the present invention.

FIG. 4 is a diagram for explaining a terminal location estimation method in a communication system according to a first embodiment of the present invention.

Referring to FIG. 4, in the terminal location estimation method according to the current embodiment, an AP 410 forms beams in a predetermined space scheduling pattern (41→41'→41"), and a terminal in the formed beam areas 41, 41', and 41" transmits its state information to the AP 410 in response to beam indication carried on a relevant beam.

When the terminal moves from a previous location 420 to a current location 420', the terminal can detect that the terminal has moved since a beam indication received in a previous beam area 41 is different from a beam indication received in a current beam area 41'. Thus, if the beam indication currently received is different from the beam indication previously received after checking the received beam indications, the terminal feedbacks a response message containing its identification (ID) and state information to the AP 410.

Figure 5:
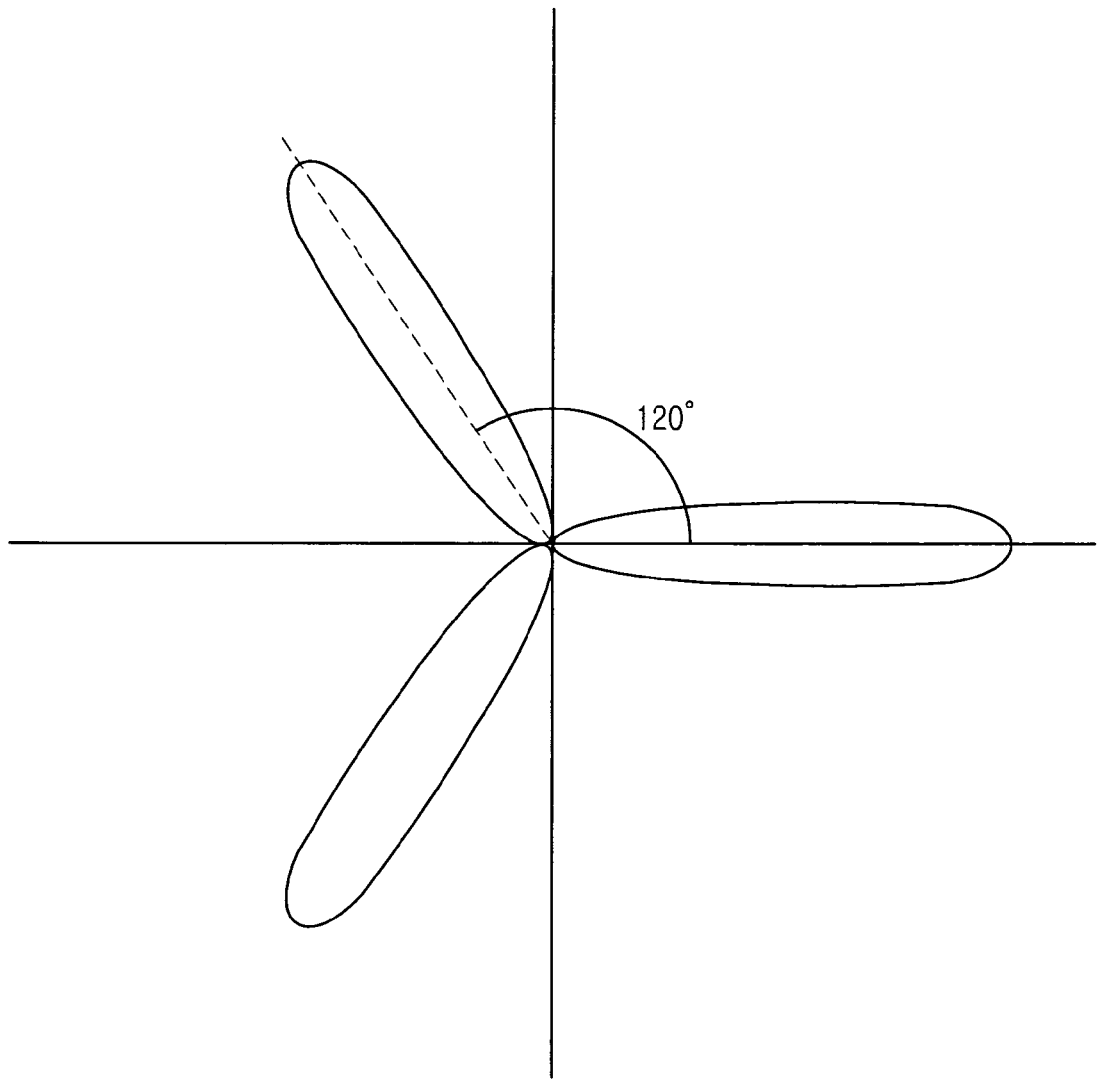
FIG. 5 is a diagram for explaining a terminal location estimation method according to a second embodiment of the present invention.

FIG. 5 is a diagram for explaining a terminal location estimation method according to another embodiment of the present invention.

Unlike the embodiment of FIG. 4, in this embodiment, three beams arranged by forming a 120° interior angle therebetween forms beam areas according to the same predetermined space scheduling pattern or respective space scheduling patterns. Although the three beams having the constant interior angle are used at the same time in this embodiment, the number of the beams and an interior angle between beams can be changed according to a system environment.

Figure 6:
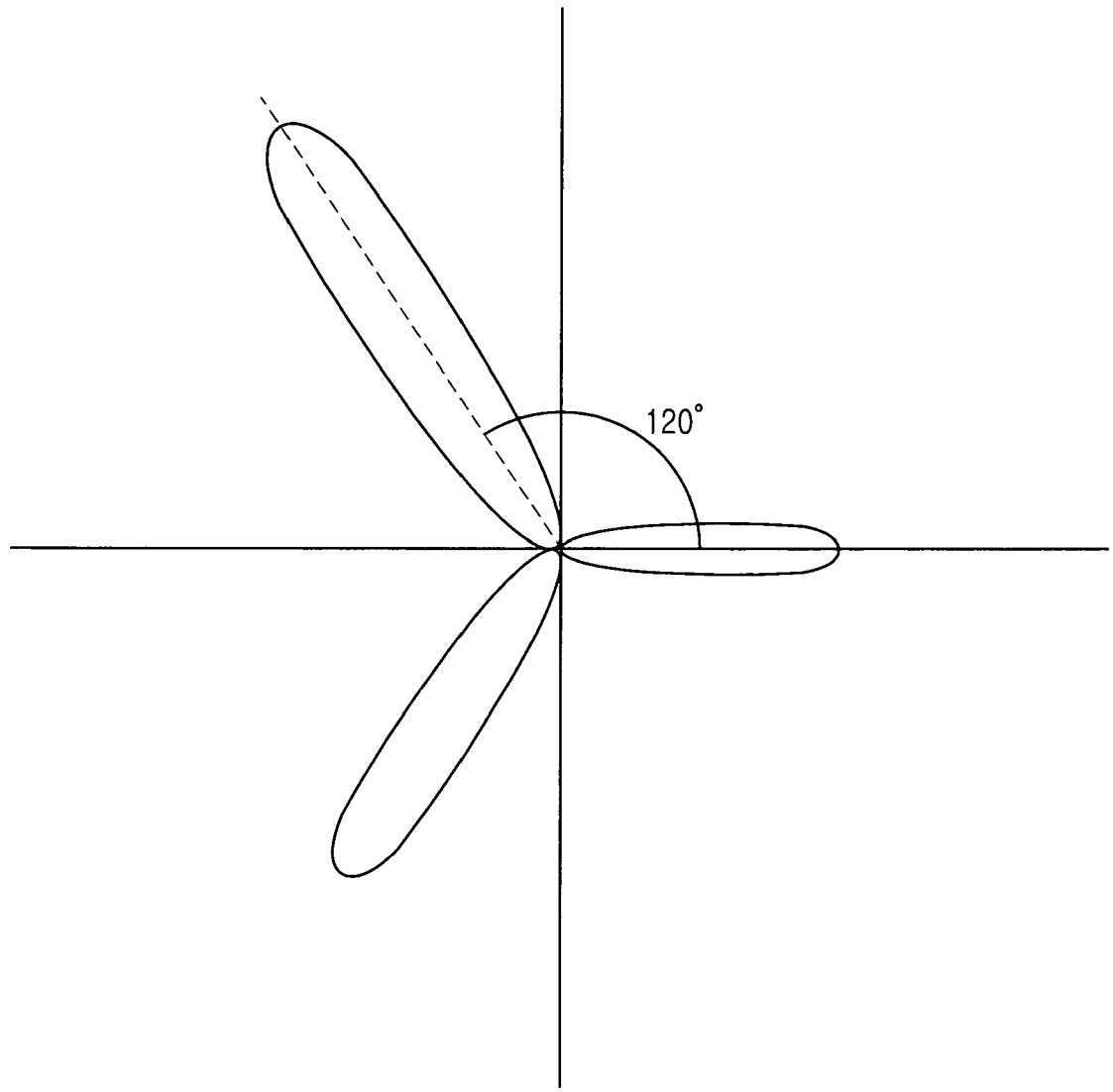
FIG. 6 is a diagram for explaining a terminal location estimation method according to a third embodiment of the present invention.

FIG. 6 is a diagram for explaining a terminal location estimation method according to a third embodiment of the present invention. Referring to FIG. 6, this embodiment is operated in the same beam forming method of the embodiment of FIG. 5 except the size of each beam, i.e., transmission power of each beam. That is, in this embodiment, a service area and the total transmission power can be controlled by variously operating the transmission power of each beam while simultaneously forming a plurality of beams.

If a terminal location estimation method according to the present invention is applied to an IEEE 802.11 network, and if more than two terminals exist in a beam area formed by each beam, the terminals try media access using a CSMA/collision avoidance (CA) method in a single beam.

Figure 7:
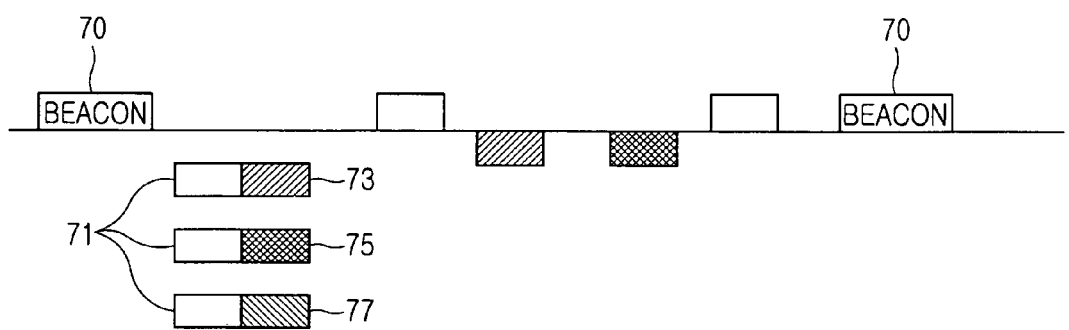
FIG. 7 is a diagram for explaining a frame transmission/reception process between an AP and a terminal when a terminal location estimation method according to the present invention is applied to an IEEE 802.11 network.

FIG. 7 is a diagram for explaining a frame transmission/reception process between an AP and a terminal when a terminal location estimation method according to the present invention is applied to an IEEE 802.11 network.

Referring to FIG. 7, the AP periodically transmits a beacon frame 70 containing a beamforming ID (BF_ID) element message to terminals. Each of the terminals, which has received the BF_ID element message, transmits its information to the AP by carrying the information on a subcarrier.

The AP confirms the existence of the terminals by receiving terminal information transmitted from the terminals and manages the terminals by generating a terminal table for each beam area. The AP transmits a downstream link frame to each terminal when a beam directing each terminal is formed based on the generated terminal table.

In the IEEE 802.11 network, the terminals use different subcarriers. Thus, the terminals receive beam information from the AP, and each of all terminals in the same coverage transmits a common preamble 71 and an individual data symbol 73, 75, or 77. In other words, after the individual terminals are turned on, respective subcarriers to be used by individual terminals are determined after a registration process, and each of the individual terminals carries its ID or media access control (MAC) address on the determined subcarrier.

As described above, in a terminal location estimation method for a cellular communication system according to the embodiments of the present invention, an AP forms beams in a predetermined scheduling pattern, and each of terminals detecting the beams registers its location by informing the AP that each of the terminals exists in a relevant beam area, and thus, a location of each of the terminals can be estimated without using a complex DOA algorithm.

In addition, since each of the terminals determines whether the terminal has moved by referring to a unique beam indication received in a beam area formed in a predetermined pattern by an AP, reliability of location estimation can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A location estimation method in a wireless communication system in which an access point (AP) provides an access service to a plurality of terminals, the location estimation method comprising:
    defining, by the AP, a plurality of beam spaces around the AP through space multiplexing;
    scheduling, by the AP, the beam spaces according to a predetermined pattern;
    forming, by the AP, a beam in at least one beam space; and
    detecting, by the AP, an existence and location of a terminal according to whether a response message in response to the formed beam is received from the terminal,
    wherein the beam contains a unique beam indication according to a beam space, and
    wherein detecting an existence and location of the terminal comprises:
        comparing the beam indication to a beam indication previously received if the terminal receives the beam indication through the beam; and
        transmitting a response message containing a terminal identification (ID) to the AP if the beam indication is different from the previous beam indication.

2. The location estimation method of claim 1, wherein the beam is formed using different transmission power according to the beam space.

3. The location estimation method of claim 1, wherein the beam is simultaneously formed in at least two beam spaces.

4. The location estimation method of claim 3, wherein the beam is formed using different transmission power in every beam space.

* * * * *